United States Patent
Jardak et al.

(10) Patent No.: US 10,866,324 B2
(45) Date of Patent: Dec. 15, 2020

(54) GNSS RECEIVER WITH AN IMPROVED CAPABILITY TO RESOLVE SUB-CARRIER TRACKING AMBIGUITIES

(71) Applicants: CENTRE NATIONAL D'ETUDES SPATIALES, Paris (FR); M3 SYSTEMS, L'Union (FR)

(72) Inventors: Nabil Jardak, Muret (FR); Willy Vigneau, Muret (FR); François-Xavier Marmet, Muret (FR); Lionel Ries, Viviers les Montagnes (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 485 days.

(21) Appl. No.: 15/192,067

(22) Filed: Jun. 24, 2016

(65) Prior Publication Data

US 2016/0377729 A1 Dec. 29, 2016

(30) Foreign Application Priority Data

Jun. 24, 2015 (EP) .................................... 15305983

(51) Int. Cl.
*G01S 19/29* (2010.01)
*G01S 19/33* (2010.01)
(Continued)

(52) U.S. Cl.
CPC ............. *G01S 19/29* (2013.01); *G01S 19/30* (2013.01); *G01S 19/33* (2013.01); *G01S 19/44* (2013.01); *G01S 19/22* (2013.01)

(58) Field of Classification Search
CPC .... G01S 19/421; G01S 19/423; G01S 19/425; G01S 19/42; G01S 19/43; G01S 19/44
See application file for complete search history.

(56) References Cited

U.S. PATENT DOCUMENTS 5,471,217 A * 11/1995 Hatch .................. G01S 19/426
342/357.27
6,285,316 B1 9/2001 Nir et al.
(Continued)

FOREIGN PATENT DOCUMENTS

EP 2382484 B1 10/2014
WO WO-2010084189 A1 * 7/2010 ............. G01S 19/30

OTHER PUBLICATIONS

Schubert, et al. (Dec. 2013). "BOC Tracking Using Phase and Sub-Carrier Locked Loops." 6th European Workshop on GNSS Signals and Signals Processing, At Neubiberg, Germany. pp. 1-6. (Year: 2013).*

(Continued)

*Primary Examiner* — Gregory C. Issing
(74) *Attorney, Agent, or Firm* — Meagher Emanuel Laks Goldberg & Liao, LLP

(57) ABSTRACT

A GNSS receiver and the associated method, for calculating an unbiased position and time measurement from a plurality of satellite positioning signals, the receiver comprising:
- a plurality of circuits configured to receive positioning signals from a plurality of satellites in GNSS constellations,
- a plurality of first and second signal processing channels configured for processing a first selection of said positioning signals and determining associated first pseudo ranges,
- a computer logic,
wherein:
- the computer logic is configured to calculate the unbiased position and time measurement from pseudo ranges being determined from positioning signals originating from distinct satellites.

(Continued)

A GNSS receiver further comprising a second computer logic configured to calculate a second unbiased position and time from the first position and time, and the second signal processing signals.

11 Claims, 9 Drawing Sheets

(51) Int. Cl.
    *G01S 19/30*      (2010.01)
    *G01S 19/44*      (2010.01)
    *G01S 19/22*      (2010.01)

(56) References Cited

U.S. PATENT DOCUMENTS

| | | | |
|---|---|---|---|
| 8,964,813 B2 | 2/2015 | Hodgart et al. | |
| 9,000,975 B2 | 4/2015 | Wendel | |
| 9,354,321 B2* | 5/2016 | Riley | G01S 19/25 |
| 2003/0231580 A1* | 12/2003 | Martin | G01S 19/02 370/203 |
| 2007/0205941 A1 | 9/2007 | Riley et al. | |
| 2010/0104046 A1* | 4/2010 | Hodgart | G01S 19/29 375/340 |
| 2012/0306690 A1* | 12/2012 | Yule | G01S 19/421 342/357.25 |
| 2015/0212211 A1* | 7/2015 | Wietfeldt | G01S 19/13 342/357.74 |

OTHER PUBLICATIONS

Rügamer, et al. (2011). "A Bavarian Initiative towards a Robust Galileo PRS Receiver." Proceedings of ION GNSS 2011. Volume: Proceedings of the 24th International Technical Meeting of the Satellite Division of the Insitute of Navigation. pp. 1-11. (Year: 2011).*

European Search Report for 15305983.7, dated Mar. 15, 2016.

Wendel J., et al., "A Robust Technique for Unambiguous BOC Tracking" Navigation, Institute of Navigation, Fairfax, VA, US. vol. 61, No. 3, Sep. 3, 2014, pp. 179-190.

Hodgart M S et al., "Dual estimate receiver of binary offset carrier modulated signals for global navigation satellite systems", Electronics Letters, IEE Stevenage, GB, vol. 43, No. 16, Aug. 2, 2007, pp. 877-878.

Hodgart M S et al., "The Optimal Dual Estimate Solution for Robust Tracking of Binary Offset Carrier (BOC) Modulation", GNSS 2007—Proceeding of the 20th International Technical Meeting of the Satellite Division of the Institute of Navigation (ION GNSS 2007), The Institute of Navigation, 8551 Rixlew Lane Suite 360, Manassa, VA 20109, USA, Sep. 28, 2007, pp. 1017-1027.

Heiries, et al., "Analysis of Non Ambiguous BOC Signal Acquisition Performance", GNSS 2004—Proceedings of the 17th International Technical Meeting of the Satellite Division of the Institute of Navigation (ION GNSS 2004), The Institute of Navigation, 8511 Rixlew Lane Suite 360 Manassa, VA 20109, USA, Sep. 24, 2004, pp. 2611-2622.

\* cited by examiner

GNSS RECEIVER WITH AN IMPROVED CAPABILITY TO RESOLVE SUB-CARRIER TRACKING AMBIGUITIES

FIELD OF THE INVENTION

The present invention applies to the field of satellite navigation. More specifically, the invention allows a satellite navigation receiver to acquire and track signals with multiple autocorrelation peaks.

BACKGROUND

There are two Global Navigation Satellite Systems (GNSS) which have been fully deployed for a number of years (the US Global Positioning System, the Russian GLONASS) and two more which are under deployment (the Chinese Beidou Navigation Satellite System and the European Galileo system). These systems rely on the same principles: microwave radio signals are broadcast from a number of satellites which orbit in a non-geostationary orbit; the signals carry a PRN (Pseudo Random Noise) code which is correlated with a local replica in a receiver configured to receive the broadcast signals; when a receiver is capable of acquiring and tracking signals from a satellite, its processing capabilities demodulate the code signal using the correlation process, and calculate a pseudo range, which is the distance between the receiver and the satellite (affected by various error sources). Because this signal is noisy and affected by errors due notably to the deviations of the electromagnetic signal path through the atmosphere or due to multipath reflections, the GNSS signal processing may be aided by other signals received from the satellite (i.e. carrier phase signal), from other satellites (Satellite Based Augmentation System, SBAS, like EGNOS) or from ground based reference stations (Ground Based Augmentation System, GBAS, like Real Time Kinematics, RTK, or its open source version, Real Time International GNSS Service, RTIGS). When a receiver is able to acquire signals from a minimum number of satellites (generally four), it is able to calculate its own position, velocity, and time (PVT) from namely the pseudo ranges previously calculated.

Radio navigation signals transmitted by the satellites are known as BOC signals (Binary Offset Carrier modulation), where a carrier wave is first modulated by a PRN code, and then by a subcarrier. The resulting signal has a spectrum having two main lobes located on either side of the carrier frequency, thus allowing cohabitation with other signals using the same carrier frequency. BOC signals are referred to as BOC (m, n), where the chip rate of the code signal is n*1.023 Mcps (Mega Chips per second), and the subcarrier frequency is m*1.023 MHz. These signals are selected for GNSS positioning instead of the traditional BPSK modulated signals because they show a better precision. Different variants of the BOC signal are used by Galileo and Beidou and will be used by the GPS 3 system.

However, a drawback of the BOC signals is that their autocorrelation function has multiple peaks and the tracking loop may therefore get locked at the correct position, on the main peak of the correlation product between the received signal and a reference signal, or at a wrong position, on a side peak of the correlation product, which creates a ranging error which can be higher than 9.7 m (case of BOC (15, 2.5)).

Various techniques have been developed to resolve this problem, either at the channel level (first type) or at the PVT calculation level (second type).

Among the techniques of the first type, are Double Estimation techniques (DET), such as the one disclosed by U.S. Pat. No. 8,964,813, and Double Discriminator techniques (DDT), such as the one disclosed by European patent n° EP2382484.

In the Double Estimation technique, the detection of a wrong peak locking is done comparing an ambiguous and a non-ambiguous pseudo range at the output of two Delay Lock Loops (DLLs). The ambiguous pseudo range is calculated considering the subcarrier and code of the BOC signal, while the non-ambiguous pseudo range is calculated from the code of the BOC signal only. The precision of the ambiguous pseudo range (obtained by correlating the full BOC signal) being higher than the precision of the non-ambiguous pseudo range (obtained by correlating only the BOC signal without the subcarrier information, having thus performances equivalent to those of a BPSK signal), the non-ambiguous pseudo range is used to determine tracking on a side peak of the BOC signal, and to readjust the ambiguous pseudo range. However, as multipath reflections might affect differently the code tracking loop and the subcarrier and code tracking loop, false readjustments of the subcarriers occur frequently in these environments, leading to false pseudo range measurements.

In the Double Discriminator Technique, an ambiguous and a non-ambiguous discriminator are calculated from the subcarrier and code of a BOC positioning signal, the choice of the discriminator value selected to control the tracking loop being performed from the value of the non-ambiguous discriminator, which helps determining tracking on a side peak. When the non-ambiguous discriminator calculation is selected, the tracking position is brought back on the main peak, and then the ambiguous discriminator calculation is selected for a better precision. The resulting pseudo range has a performance basically equaling the performance of a correlation on a BOC signal. However, because multipath reflections significantly affect the shape of the non-ambiguous discriminator, they can preclude detection of side peak tracking, which leads to wrong pseudo range measurements. Other techniques, like for example European Patent application EP15305977, hereafter called Improved DDT, show better performance in multipath environments. The Improved DDT makes a mix between the Double Estimator technique and the Double Discriminator technique, by implementing two parallel tracking loops, one tracking loop delivering a first non-ambiguous pseudo range from the code of the positioning signal, the other tracking loop delivering a second pseudo range by selecting between an ambiguous and a non-ambiguous discriminator calculation, both being constructed considering the subcarrier and code of the BOC positioning signal. The discriminator calculation selection depends on the difference between the two calculated pseudo ranges. This technique shows good performances. It requires two tracking loops, just like the DE technique. All these techniques resolve the ambiguity problem for each satellite independently from the other satellites, therefore the ambiguity resolution does not take advantage from the other received positioning signals transmitted by the other satellites.

The PVT techniques consist in computing the navigation solution and time from ranging measurements. More precisely, from a number of range and range rate measurements, the algorithm estimates the position coordinates and the velocity coordinates of the receiver and the receiver clock bias and drift with respect to the GNSS system time. Among these techniques are standard techniques not taking into account the BOC pseudo range measurements ambiguities, and techniques taking it into account, like the RAIM techniques (Receiver Autonomous Integrity), or U.S. Pat. No. 9,000,975, where all the ambiguities hypothesis are tested, or IAR techniques (Integer Ambiguity Resolution), described in the article "A Robust Technique for Unambiguous BOC tracking", of J. Wendel.

In the RAIM techniques, an unbiased PVT measurement is retrieved from various pseudo range measurements performed on distinct satellites, by calculating for example a least mean square error, a maximum separation or any other techniques. A minimum of four measurements coming from distinct satellites are needed to solve a common PVT measurement (x, y, z and time). Additional pseudo range measurements can be used to reject false measurements. These techniques are well known, and some of them come at a low cost in terms of processing power. They can detect and exclude wrong measurements, but suffers when the input pseudo ranges match side peak tracking. But some of these techniques do not deal with ambiguous pseudo ranges received from many satellites at the same time. In addition their dependence on the geometry of the satellites makes them vulnerable and subject to wrong or missed satellite exclusions.

In the IAR based techniques, the BOC pseudo range ambiguities are estimated together with the position and time solution in order to produce a position and time solution free of ambiguity errors. More precisely, a first solution is searched by assuming the ambiguities having float values (referred to as a float solution). When a float solution of all the ambiguities has been determined, an integer solution is searched around the float solution which is the most likely integer solution. The final step consists in computing the position and time solution on the measurements corrected by the estimated ambiguities of the integer solution. The integer ambiguity estimation step can be carried out by different algorithms; an efficient one is the LAMBDA (Least-square AMBiguity Decorrelation Adjustment) algorithm and is largely used for the carrier phase ambiguity resolution. These techniques require as input two pseudo range measurements acquired from each satellite, one non-ambiguous based on the code of the signal (BPSK signal), and one ambiguous, based on the subcarrier and code of the signal (BOC signal). Thus, it is known to associate this technique with a Double Estimator technique, because the two pseudo range measurements are already calculated. The drawbacks of the technique is the duplication of the tracking loops, two tracking loops, delivering a non-ambiguous BPSK pseudo range and an ambiguous BOC pseudo range, being necessary for each satellite. This duplication has a cost in the receiver design, and limits the number of satellites taken in consideration for the position and time determination. There are a number of situations, especially in environments with high-multipath reflections or weak signals, or both, where considering additional satellites is particularly advantageous. The number of tracking channels in the receiver being limited because of its direct impact on the size and power consumption of the receiver, using of the IAR technique as known from prior art, might not allow considering all in view satellites, impoverishing thus the available geometry of the satellites and therefore the navigation solution.

SUMMARY OF THE INVENTION

It is an object of the invention to provide improvements over the prior art. It achieves this goal by providing GNSS receiver architectures capable of delivering unbiased high precision position and time measurements from ambiguous pseudo range measurements, considering more satellites than prior art. In particular, the invention improves the receivers robustness against noise and propagation conditions, like multipath reflections or satellites masking, that are likely to happen when operating in a urban or indoor environment, and decrease the receiver complexity.

Thanks to the invention, various techniques of a first type can be used to determine a first native unbiased position and time. Various techniques of a second type can be used to obtain a second position. In some embodiments of the invention, switching between the techniques of the first type can be performed, either statically or dynamically. Likewise for the techniques of the second type. Also, these switches can be based on the quality of the signals received at the rover, notably the importance of multipath reflections, and/or a confidence level of the determination of the position. In some embodiments of the invention, where the first position is determined at the output of a number of channels which provide non-ambiguous pseudo ranges, the selection of these channels can be optimized as a function of the location of the rover. Also, this allocation can be made under a constraint of available channels to optimize the precision and confidence of the position determination.

To this effect, the invention discloses a GNSS receiver comprising:

a plurality of circuits configured to receive positioning signals comprising a carrier modulated by a subcarrier and a PRN code, from a plurality of satellites in GNSS constellations, a plurality of first signal processing channels configured for processing a first selection of said positioning signals and determining associated first pseudo ranges, at least one second signal processing channel configured for processing a second selection of said positioning signals, and determining associated second pseudo ranges, and a computer logic configured for calculating an unbiased position and time measurement.

The first pseudo ranges of the GNSS receiver are non-ambiguous pseudo ranges determined from the subcarrier and code of positioning signals, the second pseudo ranges are ambiguous pseudo ranges determined from the subcarrier and code of positioning signals, and the computer logic is configured to calculate the unbiased position and time measurement from the first and second pseudo ranges, all said pseudo ranges being determined from positioning signals originating from distinct satellites.

In one embodiment of the GNSS receiver, the computer logic is configured to calculate the unbiased position and time measurement using a PVT algorithm calculation resolving pseudo range ambiguities.

Advantageously, the GNSS receiver comprises at least four first signal processing channels.

Advantageously, in the GNSS receiver, the first and second selection of positioning signals are done based on a value of an index of quality of signals being calculated from at least one of power signal, carrier to noise ratio, satellite elevation angle, multipath reflection, geometric dilution of precision and a confidence level.

In one embodiment, at least two of the positioning signals processed by the first and second processing channels originate from satellites of distinct GNSS constellations.

The invention furthermore addresses a GNSS receiver, comprising:

a plurality of circuits configured to receive positioning signals comprising a carrier modulated by a subcarrier and a PRN code, from a plurality of satellites in GNSS constellations, a plurality of second signal processing channels configured for processing a second selection of said positioning signals, and determining associated second pseudo ranges, and a first computer logic configured for calculating a first unbiased position and time measurement, a second computer logic configured for calculating a second unbiased position and time measurement from the first position and time measurement, and the second pseudo ranges.

In the GNSS receiver, the second pseudo ranges are determined from the subcarrier and code of positioning signals, the first computer logic being configured to calculate the first unbiased position and time measurement from one of:

a plurality of first signal processing channels configured for processing a first selection of said positioning signals originating from distinct satellites, and determining associated non-ambiguous first pseudo ranges, or non-GNSS position and time information.

In one embodiment of the GNSS receiver, at least one of the second pseudo ranges is an ambiguous pseudo range, and the second computer logic being configured for calculating a corrected non-ambiguous pseudo range from said second pseudo range and said first position and time measurement, and for calculating the second position and time measurement using said corrected non-ambiguous pseudo range.

In another embodiment of the GNSS receiver, at least one of the second signal processing channels is configured to determine a non-ambiguous pseudo range by selecting between an ambiguous and a non-ambiguous discriminator calculation, the second computer logic being configured for calculating a residual from said non-ambiguous pseudo range and said first position and time measurement, for controlling the discriminator calculation selection of said second signal processing channel, and for calculating the second position and time measurement.

In another embodiment of the GNSS receiver, at least one of the second pseudo ranges is an ambiguous pseudo range, the second computer logic being configured for calculating virtual pseudo ranges from the first position and time measurement, and for calculating the second position and time measurement from the virtual pseudo ranges and the second pseudo ranges using a PVT algorithm calculation resolving pseudo range ambiguities.

Advantageously, the GNSS receiver comprises at least four second signal processing channels.

Advantageously, in the GNSS receiver, said or each selection of positioning signals is based on a value of an index of quality of signals being calculated from at least one of power signal, carrier to noise ratio, satellite elevation angle, multipath reflection, geometric dilution of precision and a confidence level.

In one embodiment of the receiver, at least two of the positioning signals processed by the first and second processing channels originate from satellites of distinct GNSS constellations.

The invention also discloses a method for calculating an unbiased position and time measurement, the method comprising:

a first step of receiving positioning signals comprising a carrier modulated by a subcarrier and a PRN code from a plurality of satellites in GNSS constellations, a second step of selecting a plurality of said positioning signals originating from distinct satellites for first signal processing channels configured for determining first non-ambiguous pseudo ranges from the subcarrier and code of positioning signals, a third step of selecting at least one of said positioning signals not selected in the second step, the selected positioning signals originating from distinct satellites, for second signal processing channels configured for determining second ambiguous pseudo ranges from the subcarrier and code of positioning signals, a fourth step of calculating an unbiased position and time measurement from at least said first non-ambiguous pseudo ranges determined in the second step and said second non-ambiguous pseudo ranges determined in the third step.

The invention also discloses a method for calculating an unbiased position and time measurement, the method comprising:

a first step of receiving positioning signals comprising a carrier modulated by a subcarrier and a PRN code from a plurality of satellites in GNSS constellations, a second step of calculating a first unbiased position and time measurement, a third step of selecting a plurality of positioning signals for signal processing channels configured to determine associated pseudo ranges using the subcarrier and code of positioning signals, a fourth step of calculating a second unbiased position and time measurement from the pseudo ranges determined in the third step, and the first position and time measurement.

Advantageously, the second step of the method comprises selecting a plurality of said positioning signals for signal processing channels configured for determining non-ambiguous pseudo ranges, and calculating the first unbiased position and time measurement from said non-ambiguous pseudo ranges using a PVT algorithm calculation resolving pseudo range ambiguities.

Advantageously, the second step of the method comprises calculating the first unbiased position and time measurement from non-GNSS position and time measurements.

BRIEF DESCRIPTION OF THE DRAWINGS

The invention will be better understood and its various features and advantages will become apparent from the description of various embodiments and of the following appended figures.

DETAILED DESCRIPTION

Figure 1:
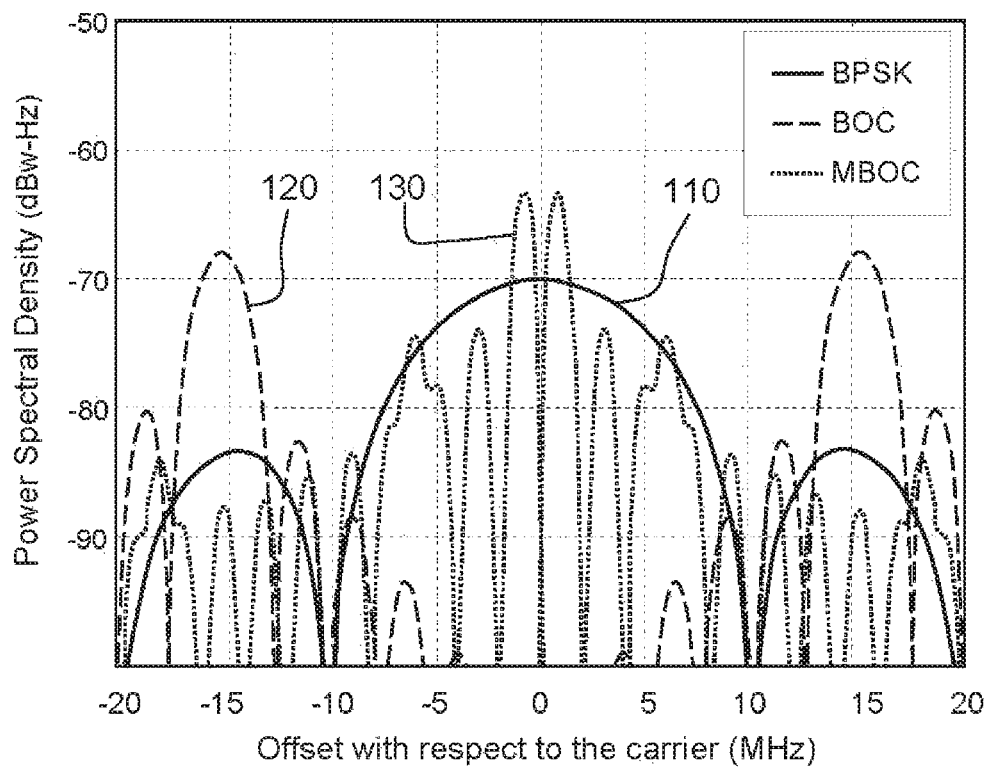
FIG. 1 represents spectrums of a BPSK, a BOC, and a MBOC signal, according to the prior art.

FIG. 1 represent exemplary spectrums of a BPSK (110), a BOC (120), and a MBOC (130) signal, according to the prior art.

In FIG. 1, spectrums are represented with respect to the carrier frequency. It can be observed that the BPSK spectrum 110 is centered on the carrier frequency.

Generating a BOC signal comprises modulating the carrier of the signal by a code and a subcarrier. BOC modulation is usually described as:

$$x(t) = \sqrt{A} \cdot d(t) \cdot c(t) \cdot s(t) \cdot \exp(j[2\pi f_c t + \theta])$$

where $\sqrt{A}$ is the complex signal's amplitude, d(t) the data transmitted (if any), c(t) the pseudo-random noise (PRN) code signal, s(t) the subcarrier signal, $f_c$ and $\theta$ the carrier frequency and phase.

As a consequence of the modulation by the subcarrier signal, the BOC spectrum 120 is split in two side bands distributed on either side of the nominal carrier frequency, with a frequency shift equivalent to the subcarrier frequency. Each lobe of the signal can be seen as a BPSK spectrum.

Such BOC signals are used for satellite positioning, the precision being better than BPSK signals, and the cohabitation with other signals using the same carrier frequency being easier, due to the subcarrier modulation.

BOC modulation has several variants, among which the sine BOC, cosine BOC, or Multiplex BOC (MBOC), which spectrum is represented by curve 130. MBOC modulation has been proposed for Galileo and modernized GPS signals, and combines a sine binary offset carrier SinBOC (1, 1) with a SinBOC (m, n). The invention applies identically whatever the BOC variant and the (m, n) set of parameters; the only requirement being that the signal is composed of a carrier wave modulated by a code and a subcarrier, with m≥n.

The BOC signals can be demodulated using the entire signal, including the code and subcarrier components, or considering only one lobe. In the latter case, the subcarrier signal of the BOC signal is suppressed by considering only one lobe of BOC signal, and shifting it by the appropriate frequency to remove the subcarrier contribution. The resulting signal still comprises the code information, and can be demodulated as a classic BPSK signal, with a 3 dB loss due to the processing of only half of the signal power spectrum density.

Figure 2A:
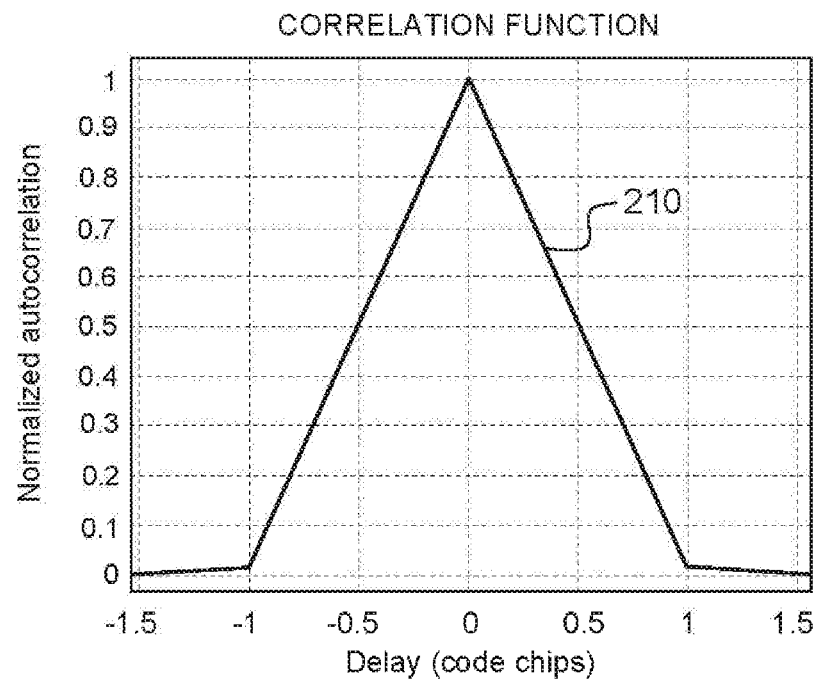
FIGS. 2a and 2b respectively represent examples of autocorrelation functions for a BPSK signal and a BOC signal, according to the prior art.
Figure 2B:
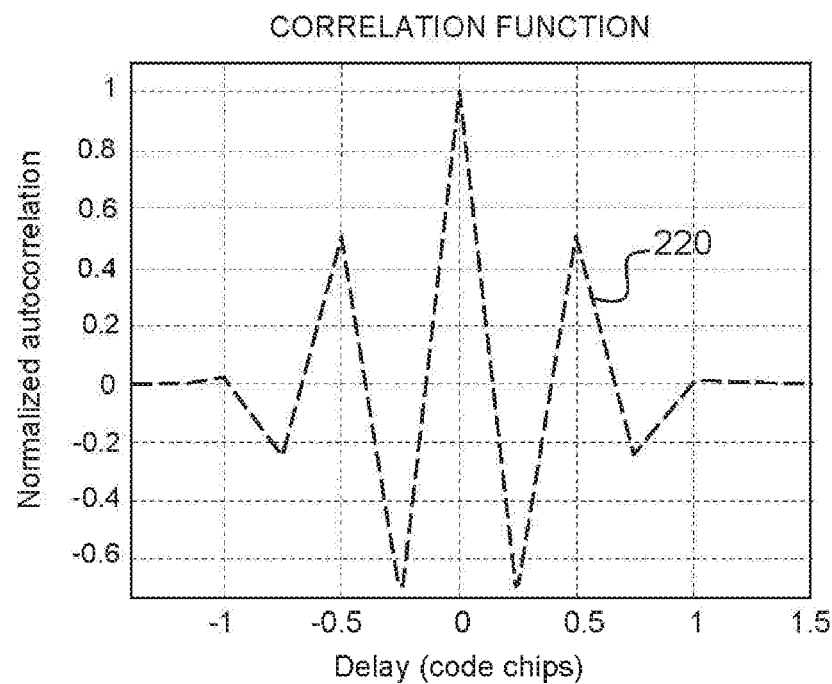

FIGS. 2a and 2b respectively represent examples of autocorrelation functions for a BPSK signal (210) and a BOC signal (220) according to the prior art, over a duration of two time chips around the perfect synchronization delay. The BPSK signal autocorrelation shows only one peak on this interval. Its maximum represents the perfect synchronization position, and can be determined in a non-ambiguous way. The BOC signal autocorrelation shows multiple peaks. As the main peak of the BOC autocorrelation is sharper than the BPSK signal autocorrelation peak, the tracking precision is better. However, in some circumstances (noisy environment, multiple propagation paths, . . . ) the tracking position can be associated with one of the side peaks, thus resulting in localization errors, which is why the autocorrelation of a BOC signal is known to be ambiguous.

The correlation function is used in the reception chain to obtain a discriminator value, which is used to sense the synchronization error based on the intercorrelation between the received signal and a reference signal constructed from an internal time reference delivered by a local oscillator, or NCO (Numerically Controlled Oscillator). This discriminator value is used in the receiver chain to detect misalignments between the local and the received code signals. It is equal to zero when the tracking position is correct (the local time reference is time synchronized with the received signal), and has a value proportional to the time shift that must be applied to the oscillator to recover from tracking errors.

As the autocorrelation function of a BOC signal is ambiguous, a discriminator value constructed from the correlation between a received BOC signal and a reference signal is ambiguous, and a tracking position may be locked on side correlation peaks.

Non-ambiguous correlations can be obtained from BOC signals. First, only one lobe of the BOC signal can be considered, and frequency shifted so that the subcarrier information is suppressed. This signal is equivalent to a BPSK signal, so the resulting discriminator value is non-ambiguous. Second, a non-ambiguous discriminator calculation can be obtained considering the envelope of the ambiguous correlation by removing the subcarrier information. This non-ambiguous discriminator calculation, referred in the prior-art as a BPSK-like discriminator, is quite similar to the discriminator calculation of the BPSK signal.

In state of the art GNSS positioning signal tracking loops, the noise of the discriminators measurements is filtered using a loop filter, the filtered discriminator values being used as a control signal for a local oscillator adjustment. The phase of the local oscillator is associated to the information transported in the received message, to determine a pseudo range. The phase of the oscillator is also used to generate the subcarrier and code reference signals, feeding the input signal correlators.

A GNSS receiver further comprises a navigator. This navigator is in charge of delivering a position, a velocity, and a time measurement from aggregated pseudo range measurements and Doppler frequency measurements, this measurement being known as PVT for 3D Position, Velocity and Timing.

According to the type of pseudo range measurements, ambiguous or non-ambiguous, the PVT precision differs. The best performance is obtained considering ambiguous pseudo range measurements and a PVT method resolving the pseudo range ambiguities, like for example the IAR techniques, or considering as input non ambiguous pseudo range measurements calculated from the full BOC signal, associated for example with a DE, DDT or Improved DDT technique. PVT measurements obtained from non-ambiguous pseudo ranges of the BOC signal considered as a BPSK signal, or using BPSK-like tracking loops, show lower precisions.

Throughout the rest of the document, velocity of the measurement is not considered. Indeed, speed is not a direct result of the analysis of the pseudo ranges, but a second order measurement which is not sensitive to side peak tracking.

Figure 3A:
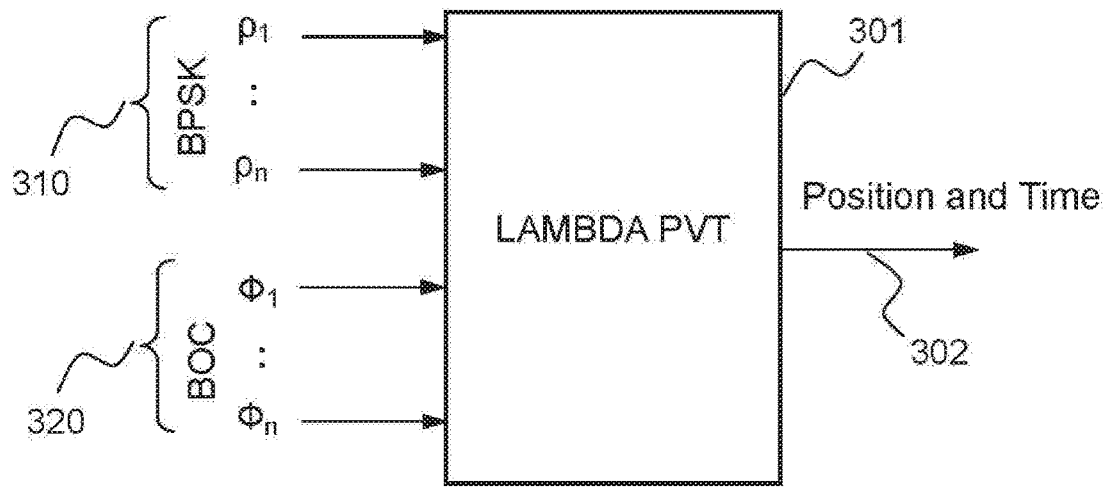
FIGS. 3a and 3b represent simplified flow charts of a navigator within a GNSS receiver of the prior art.
Figure 3B:
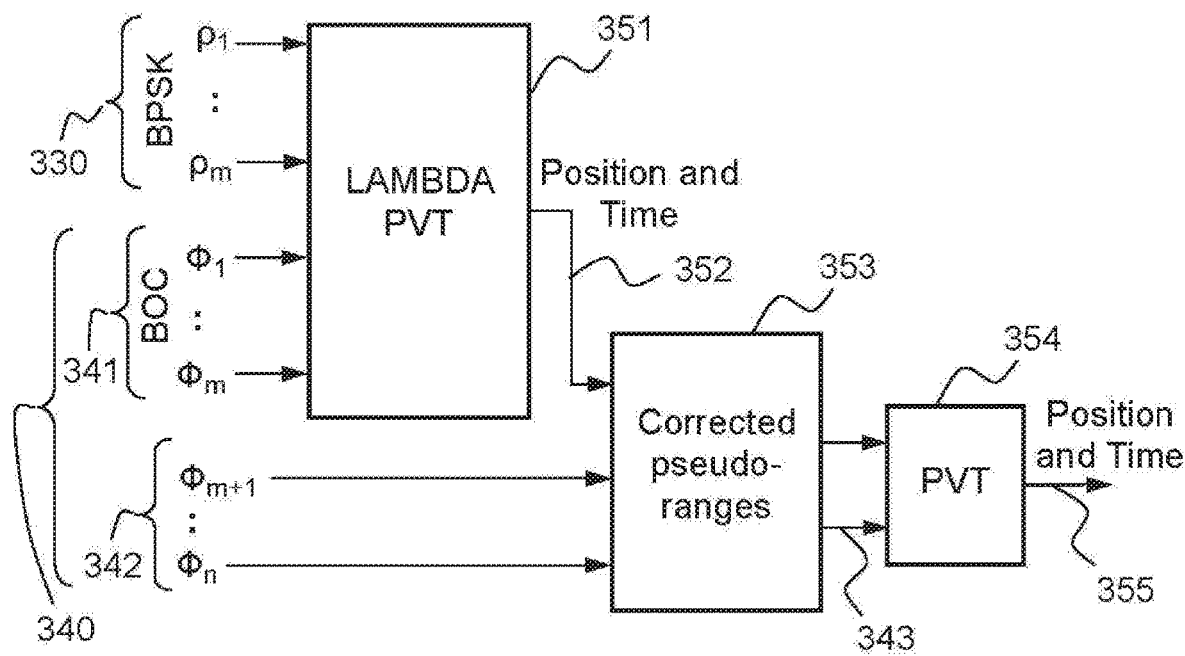

FIGS. 3a and 3b represent simplified flow charts of a navigator within a GNSS receiver of the prior art;

On FIG. 3a, a PVT algorithm 301, based on an Integer Ambiguity Resolution known from prior art, is used to determine a position and time 302. The inputs of the IAR algorithm are n non-ambiguous pseudo ranges ρ (310), and n ambiguous pseudo ranges φ (320). The output of the IAR algorithm is a position and time measurement free of pseudo range ambiguity errors, or unbiased position and time, having a good precision due to the use of the ambiguous pseudo ranges.

For each satellite in view, two tracking loops are needed, a first tracking loop based on a non-ambiguous processing of the BOC signal considered as a BPSK signal by suppressing the subcarrier information, and a second tracking loop, based on an ambiguous processing of the full BOC signal. The robustness of this solution is related to the fact that the non ambiguous and the ambiguous tracking loop are considering a same positioning signal.

Thus, the number of tracking channels in a receiver implementing the IAR PVT resolution algorithm as described in prior art is twice the number of observed satellites, which leads to implementation and processing power constraints when considering a large number of satellites, the implementation cost for each additional satellite being of two tracking loops.

In a second navigator implementation known from prior art, shown on FIG. 3b, the receiver comprises m non-ambiguous tracking loops calculating m non-ambiguous pseudo ranges 330, and n ambiguous tracking loop calculating n ambiguous pseudo ranges 340, m being lower than n.

An IAR PVT resolution algorithm 351 takes m ambiguous and non-ambiguous pseudo ranges (330, 341) as inputs, delivering a first unbiased position and time measurement 352. In order to benefit from the additional ambiguous pseudo range 342 and to use it to refine the position and time measurement, these ambiguous measurements are corrected using the determined position and time.

To perform correction of an ambiguous pseudo range measurement, a pseudo distance residual is calculated using the formula:

$$r = PR - c^* \Delta t_r - \|X_r - X^s\|,$$

where:
PR is the ambiguous pseudo range measurement,
c is the speed of light,
$\Delta t_r$ is a time difference between the receiver and the GNSS system time,
$X_r$ is reference position of the receiver,
$X^s$ is the position of the satellite, The satellite position $X_s$ is known, while $\Delta t_r$ and $X_r$ are determined by the IAR PVT algorithm 351. The residual value calculated is rounded to be a multiple of the uncertainty distance between two peaks of the BOC autocorrelation signal (which is proportional to half the subcarrier period of the positioning signal), and this rounded value is subtracted to the ambiguous pseudo range to get a non-ambiguous pseudo range.

Once the ambiguous pseudo ranges 342 are corrected into non-ambiguous pseudo ranges 343, they are used besides the ambiguous pseudo ranges 342 as inputs of a PVT algorithm 354, to deliver a second position and time measurement, which precision is better than the first one because its calculation takes into account the additional ambiguous pseudo ranges 342.

Figure 4:
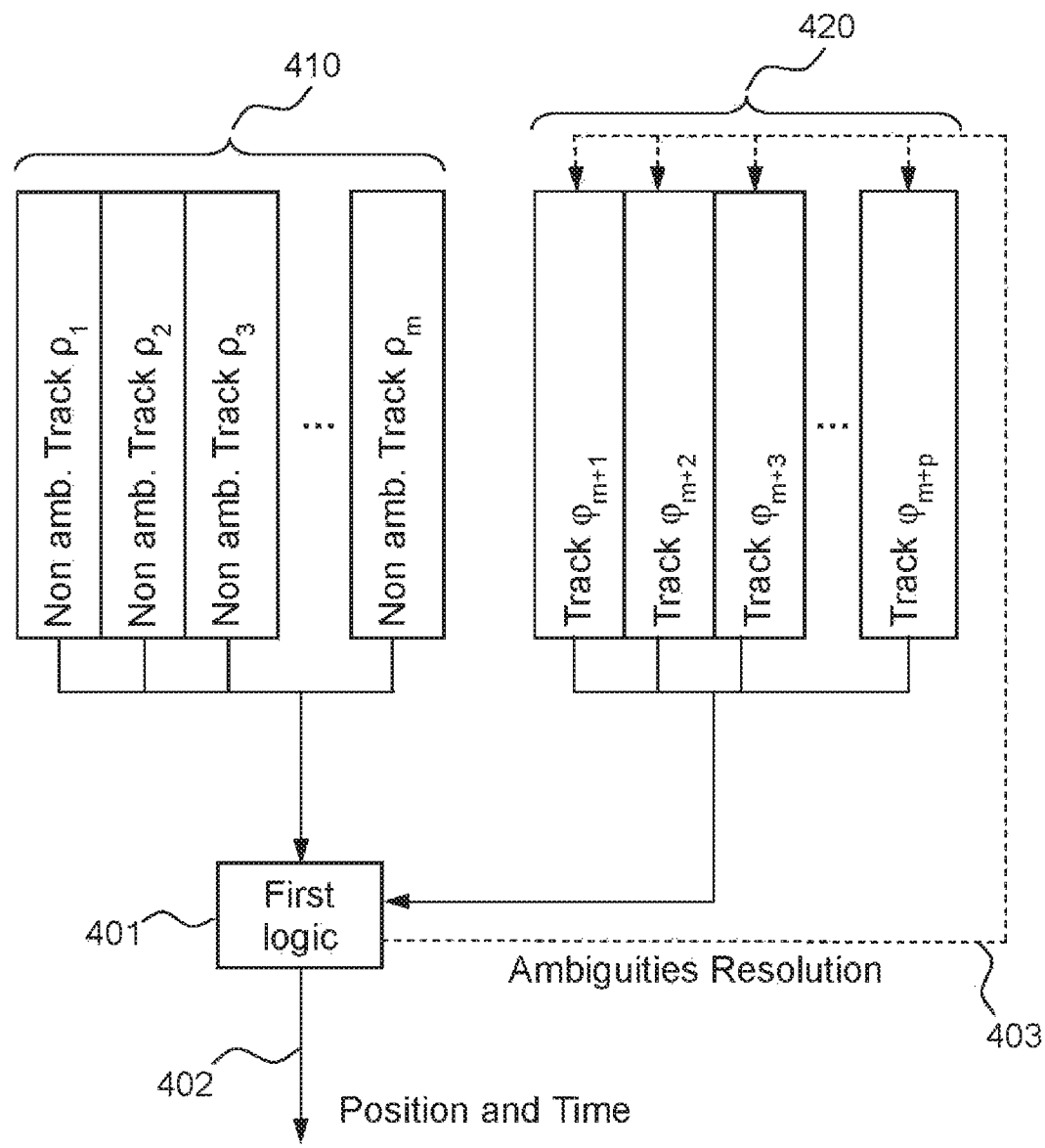
FIG. 4 represents a general flow chart of a navigator within a GNSS receiver of an embodiment of the invention, where the calculation of an unbiased position takes into account a single computer logic.

FIG. 4 represents a general flow chart of a navigator within a GNSS receiver of an embodiment of the invention, where the calculation of an unbiased position takes into account a single computer logic;

The inputs of a computer logic 401 are a first selection of m non-ambiguous pseudo range measurements 410, and a second selection of p ambiguous pseudo range measurements 420, calculated by signal processing channels implementing a tracking loop comprising an oscillator, and determining a pseudo range from the phase of the oscillator and a message transmitted in the positioning signal. The non-ambiguous pseudo range measurements and the ambiguous pseudo range measurements are used to determine an unbiased position and time using a PVT algorithm taking into account the pseudo range ambiguities, like an IAR algorithm.

Unlike prior art, where non ambiguous pseudo range measurements based on the full BOC signal (i.e. BOC pseudo range measurements from which the ambiguity has already been fixed) are used with a PVT technique not taking into account the BOC pseudo range ambiguities, the invention involves some ambiguous pseudo range measurements and a PVT algorithm taking into account the BOC pseudo range measurements ambiguities.

Unlike prior art shown in FIG. 3, wherein pairs of pseudo range measurements based on the full BOC and BPSK signals are required as input of a PVT algorithm taking into the pseudo range measurements ambiguities, the invention involves calculating non-ambiguous pseudo ranges from the subcarrier and code of the BOC positioning signal, resolving the pseudo range ambiguity using for example a Double Discriminator technique, a Double Estimation technique or any other technique or combinations of techniques.

The first pseudo ranges are used with the second pseudo ranges as inputs of a computer logic 401 configured for calculating an unbiased time and position based on a PVT algorithm that takes into account the pseudo range measurement ambiguities. The algorithm operates when the number of non-ambiguous pseudo ranges is higher than or equal to the number of unknown variables of the PVT measurement. In most cases, this number is four: three variable relative to a three-dimensional space (x, y and z), and one relative to the time. All the pseudo range measurements used as input of the computer logic are calculated from positioning signals transmitted from a distinct satellite. According to the invention, when the number of satellites considered by the receiver exceed the number of unknown variables, additional positioning signals are processed with tracking loops delivering an ambiguous tracking of the BOC signal.

As the computer logic also provides a solution to all the pseudo range ambiguities, this pseudo range can be provided to the ambiguous tracking loops 403, in order to readjust the tracking positions. This implementation shows the advantage of improving the power level of the BOC signals processed, and contributes to the overall improvement of the robustness of the tracking loops.

Such an implementation reduces the implementation complexity and required processing power compared to prior art. Considering for example five satellites in view, implementation of prior art, as described in FIG. 3a, requires a total of 10 tracking loops (5 tracking loops for the BPSK pseudo range measurements+5 tracking loops for the BOC pseudo range measurements), and an PVT algorithm calculation based on a system of 10 navigation equations (or 9 if the PVT is based on a simple difference between the measurements) to solve. Considering the invention, one needs 9 input pseudo ranges (4*2 tracking loops+1 ambiguous BOC tracking loop) when the non-ambiguous tracking is performed using the Double Estimator or the Improved DDT technique, and a PVT algorithm having only 5 navigation equations (or 4 if measurements are differences) to solve. Considering now the invention along with a DDT technique for calculating the non-ambiguous pseudo ranges, only 5 tracking loops are needed (4 DDT tracking loops+1 BOC tracking loop), the PVT algorithm being calculated on a system of 5 equations (4 if measurements are differences). In that case, the saved tracking loops can be used to increase the number of satellites in view.

In addition to a lower implementation complexity, the invention is more precise than prior art as all its inputs are pseudo ranges derived from full BOC processing, whereas the non ambiguous pseudo ranges of prior art come from BPSK tracking loops. In a multipath reflections environment, as the Improved DDT technique is known to be more robust than the others BOC pseudo range ambiguity resolution techniques, the embodiment considering Improved DDT for the four first signal processing channels delivering non-ambiguous (full-BOC) pseudo range measurement and at least one BOC tracking loop delivering an ambiguous pseudo range measurement is preferred.

Figure 5:
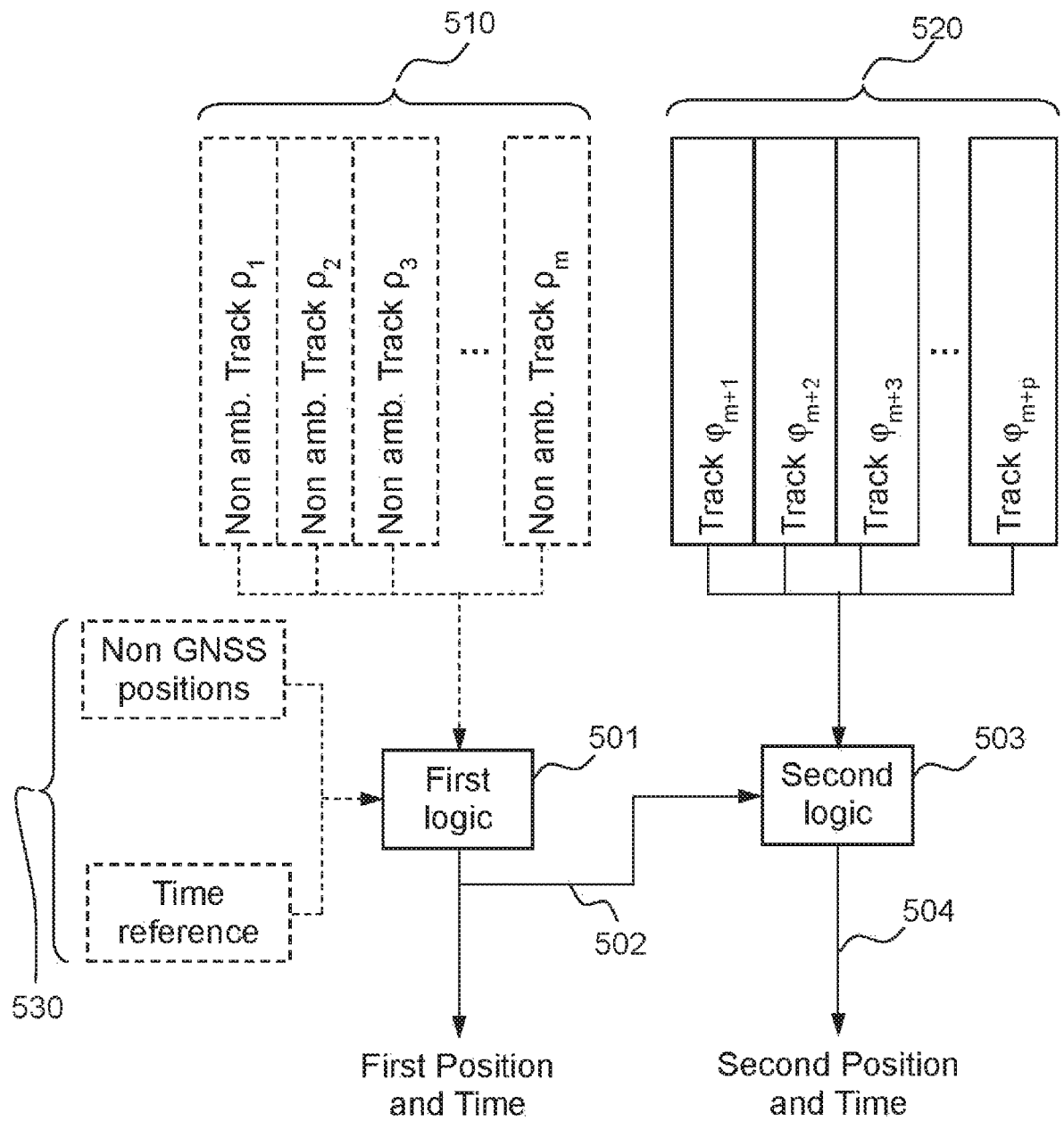
FIG. 5 represents a general flow chart of a navigator within a GNSS receiver applicable to a number of variants of the invention where the calculation of an unbiased position takes into account two distinct computer logics.

FIG. 5 represents a general flow chart of a navigator within a GNSS receiver applicable to a number of variants of the invention where the calculation of an unbiased position takes into account two distinct computer logics;

On FIG. 5, a first computer logic 501 is in charge of determining a first non biased position and time 502 from a first selection of non-ambiguous pseudo range measurements 510. The signal processing channels in charge of determining these non-ambiguous pseudo range measurements can implement tracking loops on the code of the positioning signal, considering thus the positioning signal as a BPSK signal, or tracking loops on both the subcarrier and code of the positioning signal, considering a non-ambiguous discriminator or implementing algorithms like the DET, DDT, or Improved DDT. The first solution is preferred, as it is simpler.

The number of signal processing channels for determining the first position and time is at least equal to the number of unknown variables, in order to determine an unbiased position and time measurement. As all the pseudo ranges inputting the first computer logic are non-ambiguous, the first unbiased position and time can be calculated using standard PVT algorithms not taking into account the pseudo range measurements ambiguities.

In another embodiment, the first unbiased position and time measurement is determined by the first computer logic, not from pseudo range measurements, but from internal and/or external non-GNSS sources 530, like for example a local clock and an inertial unit, or known check points. The first computer logic gathers information from those non-GNSS sources to deliver a first position and time measurement.

In both embodiments of FIG. 5, the first position and time measurement precision might not reach the precision required, as it results from non-ambiguous pseudo ranges or non-GNSS information, but the aim of this measurement is to feed a second computer logic configured for determining a second position and time 504, the second position and time having a high precision level.

The second computer logic takes as inputs a second selection of pseudo range measurements 520, calculated by second signal processing channels. Depending on the implementation choices, these pseudo range measurements are ambiguous or non-ambiguous measurements, determined from the subcarrier and code of the positioning signal. In various embodiments, the pseudo range measurements are determined from a simple ambiguous BOC positioning signal tracking loop to minimize the receiver implementation complexity, or are determined in combination with a DDT or Improved DDT technique, as will be shown later. The number of pseudo range measurements in the second selection is at least equal to the number of unknown variables of the PVT, which is four when a full 3D position and time determination has to be made.

The invention, and in particular the first and second computer logic, can be implemented on a calculation machine in a navigator of a GNSS receiver, as for example a software reprogrammable calculation machine (for example a microprocessor, a microcontroller, or a digital signal processor (DSP)) or a dedicated calculation machine (for example a Field Programmable Gate Array (FPGA), or an Application Specific Integrated Circuit (ASIC)).

The circuits of the GNSS receiver, configured to receive the positioning signals, are standards components of a RF chain, including antennas, mixers, down-converters, filters, and if needed analog to digital converters, while the processing channels determining pseudo range measurements from the positioning signal comprise analog or digital calculation logic to perform correlations between the received signal and a reference signal, and to calculate a discriminator value. They also comprise a loop filter and a numerically or voltage controlled oscillator.

Figure 6:
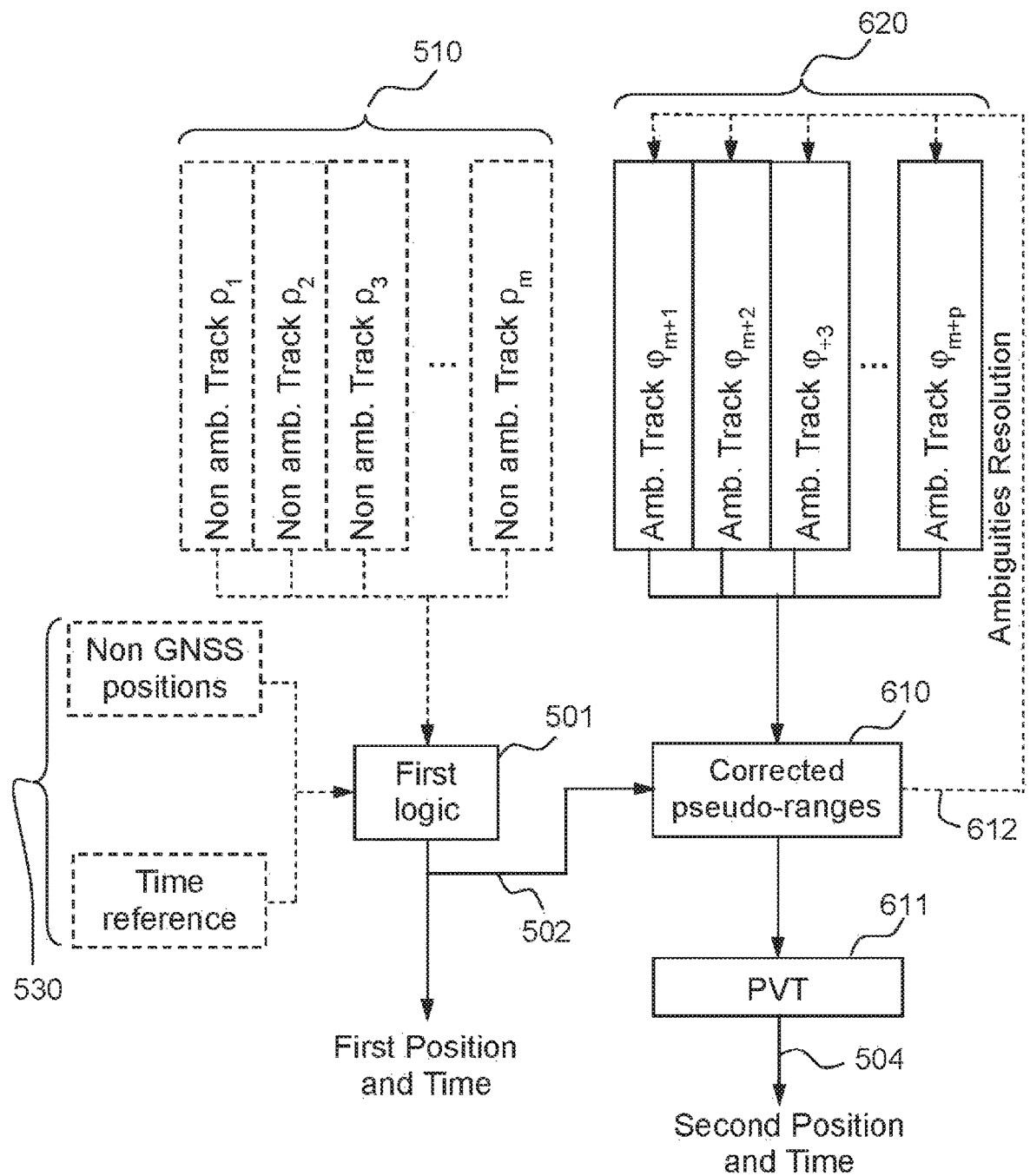
FIG. 6 represents a flow chart of an embodiment of the invention wherein at least one ambiguous pseudo range is corrected using a first position and time measurement, and where a standard PVT algorithm is calculated from the available corrected BOC pseudo ranges.
Figure 7:
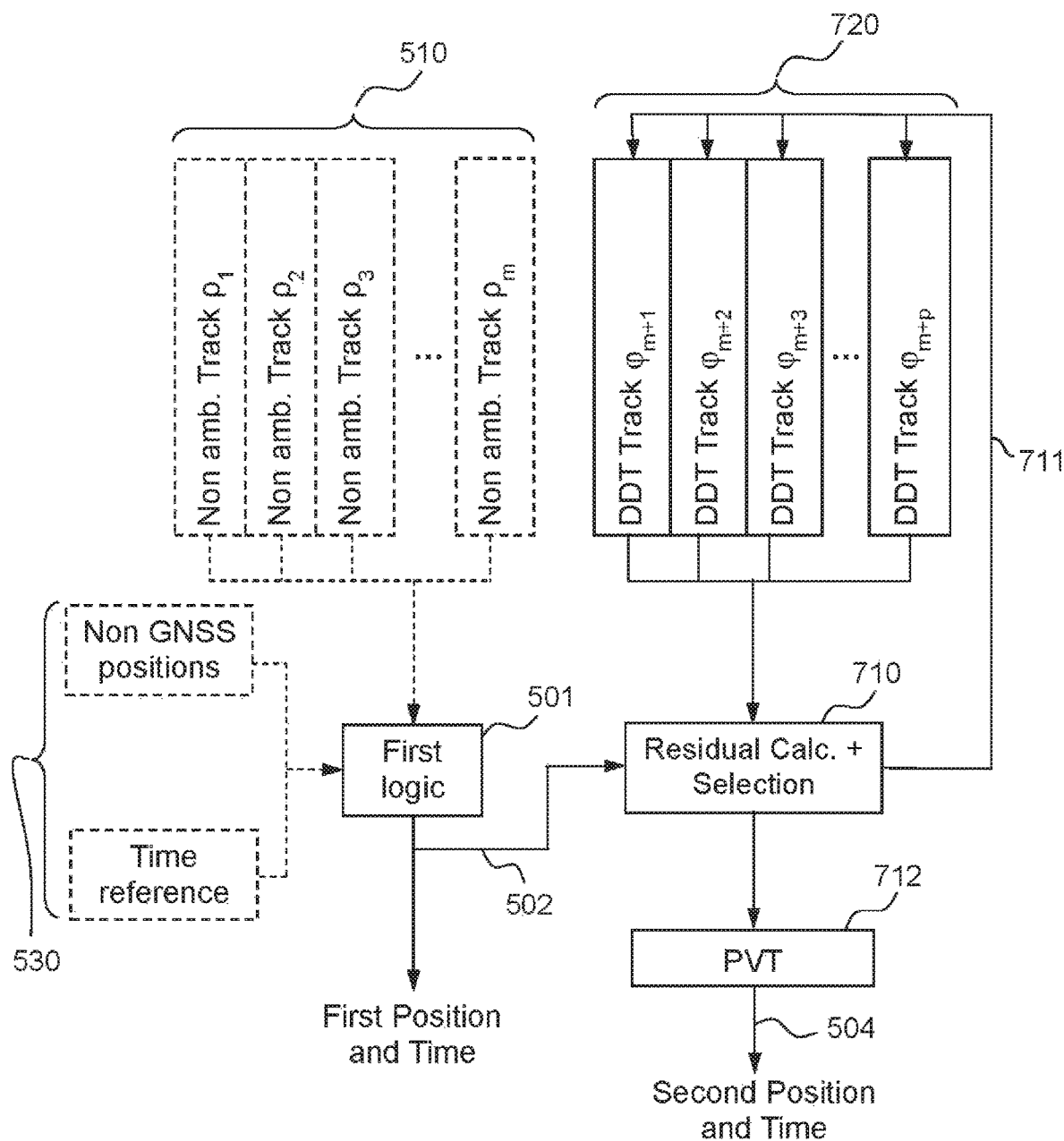
FIG. 7 represents a flow chart of an embodiment of the invention wherein at least one tracking loop calculates a non-ambiguous BOC pseudo range using a DDT or similar algorithm, where the discriminator calculation selection in the tracking loop is controlled by the residuals between the pseudo range measurement and the first position and time measurement, and where a standard PVT algorithm is calculated from available BOC pseudo ranges.
Figure 8:
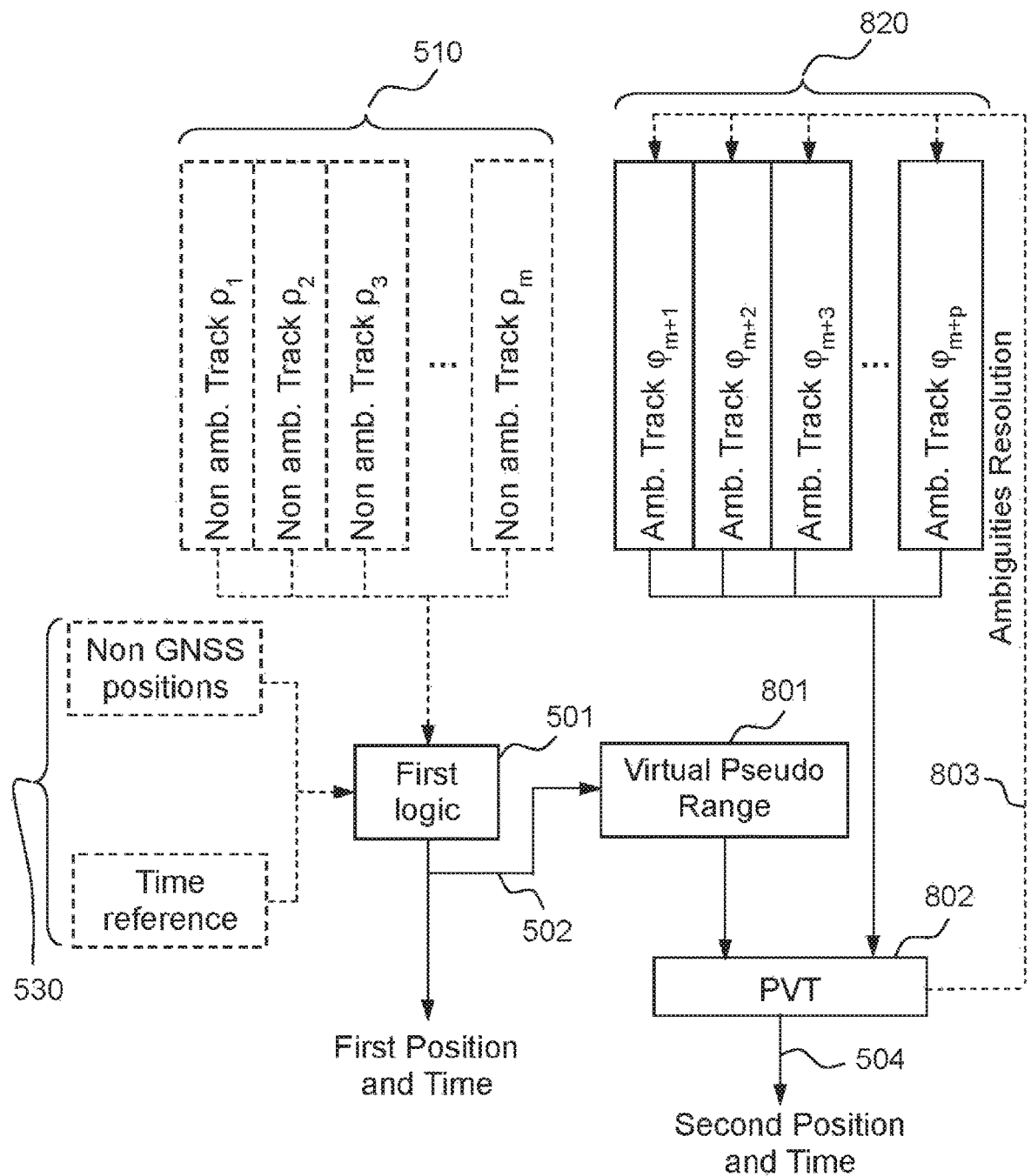
FIG. 8 represents a flow chart of an embodiment of the invention wherein virtual pseudo ranges are calculated from the first position and time measurement, and where a PVT is calculated from all available BOC pseudo ranges and virtual pseudo ranges.

Various variants of the invention are considered in FIG. 6 to FIG. 8. All the described structures require a first selection of m non-ambiguous pseudo range measurements or a non GNSS time and position reference, and a second selection of p additional pseudo range measurements.

Considering that the tracking loops implemented to measure the m non-ambiguous pseudo ranges are obtained from simple BPSK tracking loops, and that the tracking loops implemented to measure the p pseudo ranges are simple BOC tracking loops, the total number of tracking loops of the embodiment of the invention is m+p, m being generally 4. This therefore is a significant advantage compared to prior art techniques, where the number of tracking loops equals generally 2*p for a same precision level in a Gaussian environment, and a lower precision level in a multipath reflections environment.

FIG. 6 represents a flow chart of an embodiment of the invention wherein at least one ambiguous pseudo range is corrected using a first position and time measurement, and where a standard PVT algorithm is calculated from the available corrected BOC pseudo ranges;

On FIG. 6, the second pseudo range measurements 620 are ambiguous pseudo range measurements from tracking loops considering the full BOC positioning signal (subcarrier and code). The second computer logic comprises a logic 610 configured to correct the m ambiguous pseudo range measurements 620 using the first position and time measurement 502. This correction is performed considering a residual calculation known from prior art, as described for example on FIG. 3b, and correcting the ambiguous pseudo ranges depending on the residual value.

The corrected pseudo ranges determined from the ambiguous tracking loop, are then processed by a PVT algorithm 611, the algorithm being either standard or a more elaborate algorithm such as for example a RAIM algorithm to further check the coherency of the measurements, and to obtain a second position and time measurement 504, whose precision is high because the inputs of the measurement are non-ambiguous pseudo ranges calculated from the BOC signal including the subcarrier and code information.

The implementation can comprise a feedback loop 612, taking into account the ambiguities determined during the correction of the ambiguous pseudo ranges 610, to correct the tracking position of the ambiguous tracking loops 620.

FIG. 7 represents a flow chart of an embodiment of the invention wherein at least one tracking loop calculates a non-ambiguous BOC pseudo range using a DDT or similar algorithm, where the discriminator calculation selection in said DDT tracking loop is controlled considering the residual measurement between the pseudo range measurements and pseudo ranges constructed from the first position and time measurement. On FIG. 7, a PVT algorithm, being standard or more elaborated, is calculated from all available BOC pseudo ranges.

On FIG. 7, the second pseudo range measurements 720 are non-ambiguous pseudo range measurements from tracking loops considering the full BOC positioning signal. These tracking loops shall implement techniques close to the Direct Discriminator technique, wherein a discriminator calculation used in a BOC signal tracking loop is selected from a non-ambiguous discriminator calculation and an ambiguous discriminator calculation considering the subcarrier and code of a positioning signal.

Unlike the DDT, the discriminator calculation selection is not performed depending on the value of a non-ambiguous discriminator calculation (DDT), or a difference between a non-ambiguous pseudo range and an ambiguous pseudo range (Improved DDT), but from the output of a residual calculation 710.

Thus, the second computer logic comprises a logic 710 configured to calculate a residual between the non-ambiguous pseudo ranges, and the position and time measurement 502. The value of this residual is compared to a threshold and used to control 711 the discriminator calculation selection in the various tracking loops. When the residual measurement exceeds a threshold, the concerned tracking loop select a non-ambiguous discriminator calculation for a predefined period of time in order to bring the tracking position back on the main correlation peak of the BOC signal. This operation is performed for each tracking loop, and increases the robustness of the BOC signal main correlation peak tracking, because the discriminator selection done in the pseudo range domain is more precise than the discriminator selection done based on a discriminator calculation.

The pseudo range measurements 720 are used as inputs of a PVT algorithm, being a standard algorithm of a more elaborated one, like a RAIM algorithm, to determine a high precision second unbiased position and time measurement.

FIG. 8 represents a flow chart of an embodiment of the invention wherein virtual pseudo ranges are calculated from the first position and time measurement, and where a PVT is calculated from all available BOC pseudo ranges and virtual pseudo ranges.

On FIG. 8, the second pseudo range measurements 820 are ambiguous pseudo range measurements from tracking loops considering the full BOC positioning signal. The second computer logic comprises the calculation of virtual pseudo ranges 801. A virtual pseudo range is a quantity that describes the distance between a satellite and a receiver, taking into account the receiver clock drift and the effect of the other error sources (when not already removed of the ambiguous pseudo range measurements done prior to the PVT calculation). The virtual pseudo ranges are extrapolated from the position of at least four satellites considered by the tracking loops 820, four being the number of unknown variables of the PVT of the second position and time determination. The virtual pseudo ranges are constructed using the formula:

$$VPR = \|X_r - X^s\| + c^* \Delta t_r,$$

where:
VPR is the virtual pseudo range,
c is the speed of light,
$\Delta t_r$ is a time difference between the receiver and the GNSS system time,
$X_r$ is reference position of the receiver,
$X^s$ is the position of the satellite, By using this formula for residuals computation, it is assumed that the ambiguous pseudo range measurements have already been corrected for the error sources other than the receiver clock bias $\Delta t_r$.

The satellite position $X^s$ is known, while $\Delta t_r$ and $X_r$ are the first position and time measurement 502 calculated by the first computer logic. The virtual pseudo range values are more precise than a pseudo range measurement acquired from a non-ambiguous tracking loop, as long as the first position and time measurements are sufficiently good. The ambiguity resolution of the pseudo range measurements 820 is more robust, as they result of an estimation algorithm aggregating the measurements form many satellites. Indeed the ambiguity of weak signal satellites is solved by taking advantage from the available measurements including those received from strong signal satellites.

The second computer logic further comprises a PVT algorithm calculation 802 taking into account the pseudo range measurements ambiguities. The inputs to this algorithm are the calculated virtual pseudo ranges, and the ambiguous pseudo ranges 720, the output being a second unbiased position and time measurement 504.

The implementation can comprise a feedback loop 803, taking into account the ambiguities determined by the PVT algorithm calculation, to correct the tracking positions of the various ambiguous tracking loops.

The examples disclosed in this specification are only illustrative of some embodiments of the invention. They do not in any manner limit the scope of said invention which is defined by the appended claims. In particular, the invention concerns a GNSS receiver device comprising a navigator implementing a mix of the systems described in FIGS. 6, 7 and 8.

For the various examples presented above, first pseudo range measurements (410, 510) inputting the first computer logic are calculated from positioning signals originating from distinct satellites. In FIG. 5, the ambiguous and non-ambiguous pseudo range measurements of the first and second signal processing channels originate from distinct satellites, unlike in prior art shown in FIGS. 3a and 3b, where pairs of pseudo range measurements performed on a same positioning signal, are required. Thus, tracking loops usage is optimal as each tracking loop of the receiver computes a pseudo range from the subcarrier and code of the received signal, improving the quality of the position and time measurement.

On FIGS. 6 to 8, pseudo range measurements 510 inputting the first computer logic also originate from distinct satellites as the first computer logic only requires non-ambiguous pseudo ranges. Second pseudo range measurements, transmitted to the second computer logic, also originate from distinct satellites. However, the first and the second pseudo range measurements can be calculated from a same positioning signal.

The association between the positioning signals and the signal processing channels in charge of calculating pseudo range measurements can be performed dynamically, considering an index of quality of signals calculated from at least one of power signal, carrier to noise ratio, satellite elevation angle, multipath reflection, geometric dilution of precision and a confidence level, or a combination of these parameters.

The quality of each positioning signal can be monitored periodically, in order to adapt the signal processed to variations of the propagation environment. This property is particularly important when operating in a dense environment like urban or indoor, wherein temporary or permanent masking of satellites can occur.

The positioning signals can also be retrieved from satellites belonging to distinct GNSS constellation. In this case, as the time references of the various constellations systems are not synchronized, an additional variable, relative to the time difference between the two constellations time references, must be taken into account in the PVT calculation. The time difference information can be either received as input (for example taken from the navigation message of GNSS signals) or estimated as an additional unknown of the navigation problem. In that case, the minimum number of pseudo ranges taken into consideration in the first and second computer logic increases accordingly.

Figure 9:
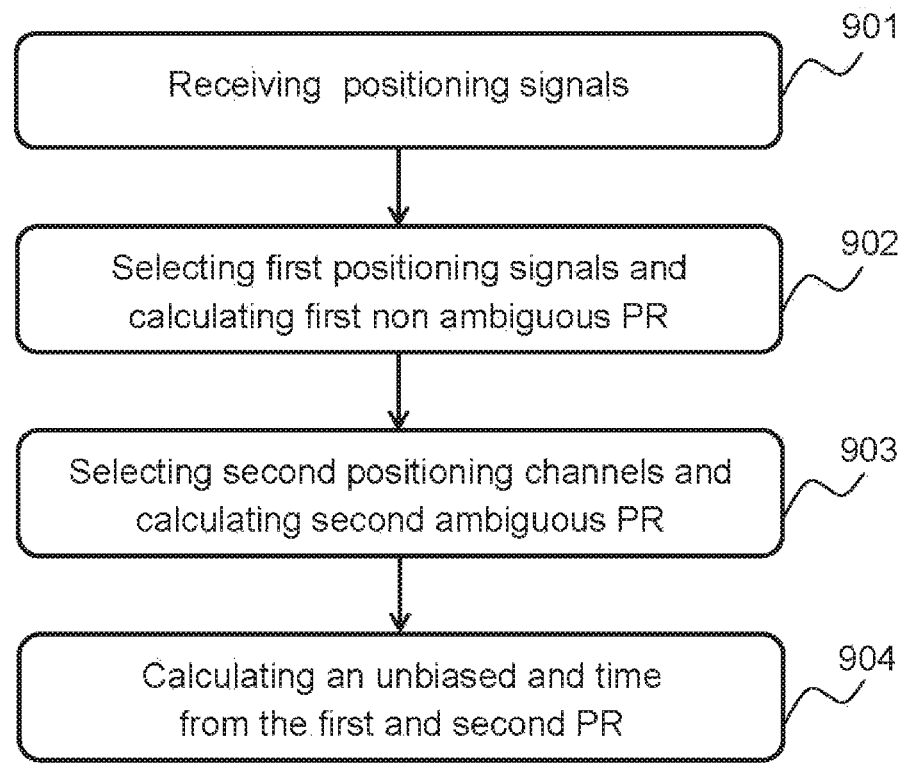
FIG. 9 represents a flow chart of a method according to the invention.

The invention further addresses a method for calculating an unbiased position and time in a GNSS receiver, illustrated by the flow chart in FIG. 9.

The method comprises:

a first step 901 of receiving positioning signals comprising a carrier modulated by a subcarrier and a PRN code from a plurality of satellites in GNSS constellations, the positioning signals being BOC modulated signals, a second step 902 of selecting a plurality of said positioning signals originating from distinct satellites for first signal processing channels configured for determining first non-ambiguous pseudo ranges 410 from the subcarrier and code of positioning signals. The selection is performed at regular intervals, or when one of the measured quality signals is below a threshold. The aim of this step is to adapt the positioning signals considered by the signal processing channels to the receiving conditions, which might vary, particularly when the receiver is in urban or indoor environment, when the receiver is on the move, or from the fact that the satellites are non stationary satellites. Each of the first signal processing channels is associated to one positioning signal being distinct from the positioning signals associated to the others first processing channels. The signal quality can be calculated from various indicators, like for example the power level, the carrier to noise ratio, the satellite elevation angle, the multipath reflections, the geometric dilution of precision, a confidence level, or any combination of these indicators. The first non-ambiguous pseudo range measurements are calculated considering the received signal with the subcarrier information, using for example a DE, DDT or improved DDT technique. The number of non-ambiguous measurements needed depends on the number of unknown variables. To determine a full 3D position plus a time, 4 non-ambiguous pseudo range measurements are needed.

a third step 903 of selecting at least one of the positioning signals not selected in the second step, the selected positioning signals originating from distinct satellites, for second signal processing channels configured for determining second ambiguous pseudo ranges 420 from the subcarrier and code of positioning signals. This step is identical to the second step, considering other positioning signals, at the difference that the pseudo ranges are ambiguous, based on the subcarrier and code of the BOC positioning signal. These second signal processing channels can be calculated using a simple BOC tracking loop. In order to reduce the receiver complexity, it is recommended to use second signal processing channels for each positioning signal considered above four, four being the number of unknown variables.

a fourth step 904 of calculating an first unbiased position and time measurement from at least said first non-ambiguous pseudo ranges determined in the second step and said second non-ambiguous pseudo ranges determined in the third step. This step is performed using a PVT algorithm taking into account ambiguous pseudo range measurements, as the inputs of the first calculation logic are a mix of non-ambiguous and ambiguous pseudo ranges.

Figure 10:
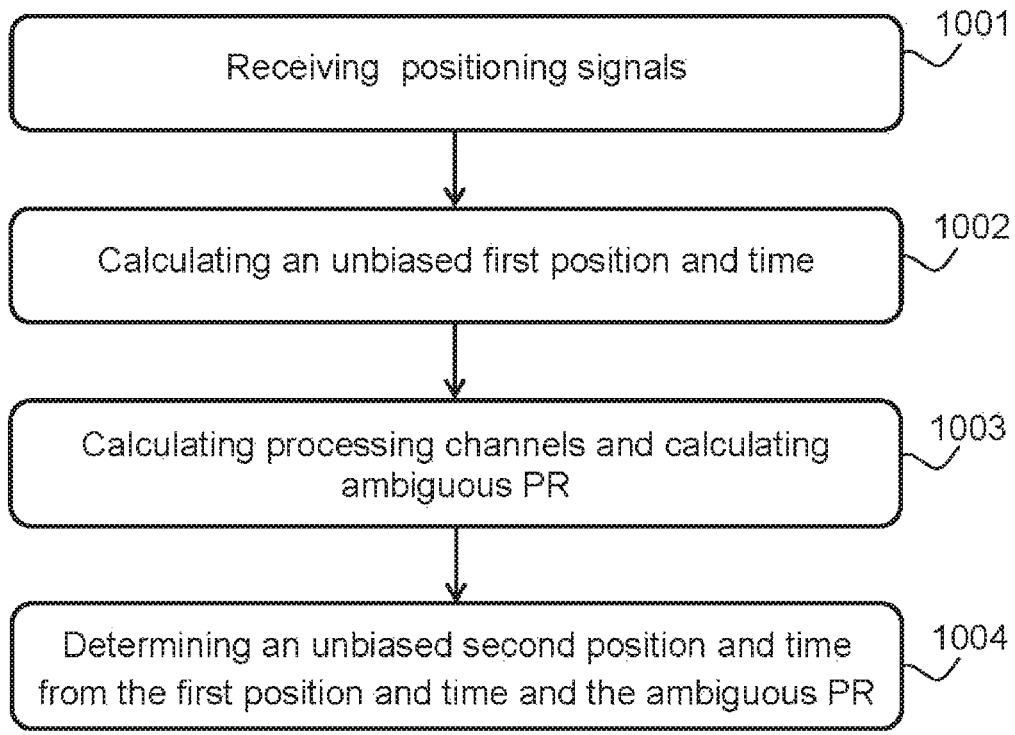
FIG. 10 represents a flow chart of another method according to the invention, where a PVT is determined using a first position and time information.

The invention further addresses a method for calculating an unbiased position and time in a GNSS receiver, where a PVT is determined using a first position and time measurement, illustrated by the flow chart on FIG. 10.

This method comprises:

a first step 1001 of receiving positioning signals comprising a carrier modulated by a subcarrier and a PRN code from a plurality of satellites in GNSS constellations, the positioning signals being BOC modulated signals, a second step 1002 of calculating an first unbiased position and time measurement. This step can be performed considering a first selection of pseudo ranges 510 measured from positioning channels originating from distinct satellites, of non-GNSS information 530, as local clocks, known check points, inertial navigation system, or any other relevant information. When operating from the first selection of positioning satellites, this step comprises calculating first non-ambiguous pseudo range, based on the code only or on the subcarrier and code of the positioning signals, and determining a position and time using a standard or more elaborated PVT algorithm calculation. The first position and time measurement might not reach the expected level of precision, depending on the input of this measurement, but is used to calculate a second, more precise, position and time.

a third step 1003 of selecting a plurality of positioning signals for signal processing channels configured to determine associated pseudo ranges 520 using the subcarrier and code of positioning signals. Depending on the implementation of the second signal processing channels, these pseudo ranges can be ambiguous or non-ambiguous, but delivers precise measurements. If the pseudo range measurements are ambiguous, they can be measured using a simple BOC signal tracking loop. If they are non-ambiguous, they can be measured using a DDT tracking loop, or any equivalent technique.

a fourth step 1004 of calculating a second unbiased position and time measurement from the pseudo ranges determined in the third step, and the first position and time measurement. This step requires distinct calculations, depending on the inputs of the second position and time measurement.

When second signal processing channels calculate ambiguous pseudo range measurements, as in the receiver of FIG. 6, the second position and time measurement done in the fourth step of the process may consist in a residual calculation, considering the first position and time measurement. From this calculation, the pseudo range ambiguity can be corrected and used as an input of a PVT algorithm.

When second signal processing channels calculate non-ambiguous pseudo ranges using a technique close to the DDT technique, as in the receiver of FIG. 7, the second position and time measurement done in the fourth step may consist in a residual calculation, considering the first unbiased position and time measurement, and a comparison with a threshold to control the selection of the ambiguous or non-ambiguous discriminator calculation within the DDT-like tracking loop. The pseudo range measurements are non-ambiguous, and used to address a PVT algorithm.

When second signal processing channels calculate ambiguous pseudo range, as in the receiver shown in FIG. 6, the second position and time measurement done in the fourth step may consist in calculating virtual pseudo ranges, based on the first position and time measurement. One virtual pseudo range can be calculated for each second signal processing channel. A PVT algorithm taking into account the pseudo range ambiguities, like an IAR PVT algorithm, takes as inputs the virtual pseudo ranges and the ambiguous pseudo ranges to determine a high precision second unbiased position and time.

As in the previous method, the positioning signals selection within the first, if relevant, and second signal processing channels, can be performed dynamically, considering an index of the signal quality.

The invention claimed is:

1. A GNSS receiver configured to receive positioning signals comprising a carrier modulated by a subcarrier and a PRN code from a plurality of satellites in GNSS constellations, the receiver comprising:
   a plurality of first tracking loops configured for processing a first set of said positioning signals and for determining associated first pseudo ranges, each first tracking loop being controlled by a non-ambiguous discriminator calculated based on a correlation function having a single peak,
   a plurality of second tracking loops configured for processing a second set of said positioning signals and for determining associated second pseudo ranges from the subcarrier and the PRN code of the second set of said positioning signals, each second tracking loop being controlled by an ambiguous discriminator calculated based on a correlation function having multiple peaks, and
   a first computer logic configured for calculating a first position and time measurement from the said first pseudo ranges only,
   a second computer logic configured for calculating a second position and time measurement from the second pseudo ranges, using the first position and time measurement to resolve ambiguities of the second pseudo ranges.

2. The receiver of claim 1, wherein:
   the second computer logic is configured for calculating the second position and time measurement by computing a pseudo range residual associated to each of the second pseudo ranges using the first position and time measurement, correcting ambiguities of the second pseudo ranges based on the values of the associated pseudo range residual, and calculating the second position and time measurement from said corrected second pseudo ranges.

3. The receiver of claim 1, wherein:
   the second tracking loops are further configured to calculate a non-ambiguous discriminator based on a correlation function having a single peak, and to select between the ambiguous discriminator and the non-ambiguous discriminator to compute said second pseudo range, and
   the second computer logic is configured for computing a pseudo range residual associated to the pseudo range computed by the second tracking loops using the first position and time measurement, for controlling the selection between the ambiguous discriminator and the non-ambiguous discriminator in the second tracking loops based on the associated pseudo range residuals, and for calculating the second position and time measurement from the second pseudo ranges.

4. The receiver of claim 1, wherein:
   the second computer logic is configured for calculating virtual pseudo ranges based on the first position measurement, the position of the satellites from which originate the second set of positioning signals and a difference between a system time of the receiver and the first time measurement, and for calculating the second position and time measurement from the virtual pseudo ranges and the second pseudo ranges using a resolution algorithm resolving pseudo range ambiguities.

5. The receiver of claim 1, comprising at least four second tracking loops.

6. The receiver of claim 1, wherein the first set of positioning signals and the second set of positioning signals are established based on a value of an index of quality of the positioning signals being calculated from at least one of power signal, carrier to noise ratio, satellite elevation angle, multipath reflection, geometric dilution of precision and a confidence level.

7. The receiver of claim 1, wherein at least two of the positioning signals processed by the first and second tracking loops originate from satellites of distinct GNSS constellations.

8. A method for calculating a position and time measurement, the method comprising:
   a first step of receiving positioning signals, in a GNSS receiver, comprising a carrier modulated by a subcarrier and a PRN code from a plurality of satellites in GNSS constellations,
   a second step of using a plurality of the positioning signals as inputs for first tracking loops configured to determine associated first pseudo ranges, each first tracking loop being controlled by a non-ambiguous discriminator calculated based on a correlation function having a single peak, and of calculating, by first computer logic, a first position and time measurement from said first pseudo ranges only,
   a third step of using a plurality of the positioning signals as inputs for second tracking loops configured to determine associated second pseudo ranges from the subcarrier and PRN code of said positioning signals, each second tracking loop being controlled by an ambiguous discriminator calculated based on a correlation function having multiple peaks,
   a fourth step of calculating, by second computer logic, a second position and time measurement from the second pseudo ranges determined in the third step, using the first position and time measurement to resolve ambiguities of the second pseudo ranges.

9. The method of claim 8, wherein:
   the fourth step comprises computing a pseudo range residual associated to each of the second pseudo ranges calculated in the third step using the first position and time measurement calculated in the second step, correcting ambiguities of the second pseudo ranges based on the values of the associated pseudo range residuals, and calculating the second position and time measurement from said corrected second pseudo range.

10. The method of claim 8, wherein:

the second tracking loops are further configured to calculate a non-ambiguous discriminator based on a correlation function having a single peak, and to select between the ambiguous discriminator and the non-ambiguous discriminator to compute said second pseudo range, and the fourth step comprises computing a pseudo range residual associated to the pseudo range computed by the second tracking loops using the first position and time measurement calculated in the second step, controlling the selection between the ambiguous discriminator and the non-ambiguous discriminator the second tracking loops based on the associated pseudo range residuals, and calculating the second position and time measurement from the second pseudo ranges.

11. The method of claim 8, wherein:

the second computer logic is further configured for calculating virtual pseudo ranges based on the first position measurement calculated in the second step, the position of the satellites from which originate the positioning signals used in the third step and a difference between a system time of the receiver and the first time measurement, and further comprises calculating the second position and time measurement from the virtual pseudo ranges and the second pseudo ranges using a resolution algorithm resolving pseudo range ambiguities.

* * * * *